United States Patent
Schwarcz

(10) Patent No.: US 6,964,038 B2
(45) Date of Patent: Nov. 8, 2005

(54) CONSTANT VALUES IN MIXED LANGUAGE PROGRAMMING ENVIRONMENTS

(75) Inventor: Lawrence R. Schwarcz, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 727 days.

(21) Appl. No.: 09/905,917

(22) Filed: Jul. 17, 2001

(65) Prior Publication Data

US 2003/0018956 A1 Jan. 23, 2003

(51) Int. Cl.[7] ............................................... G06F 9/45
(52) U.S. Cl. ..................................... 717/136; 717/115
(58) Field of Search ............................. 717/136, 138, 717/114, 115; 718/100; 704/1

(56) References Cited

U.S. PATENT DOCUMENTS 6,219,831 B1 * 4/2001 Ono ............................ 717/136

OTHER PUBLICATIONS

"On the Cost of Mixed Language Programming", Mladen A. Vouk, SIGPLAN Notices, V19 #12, Dec. 1984.*

* cited by examiner

*Primary Examiner*—Antony Nguyen-Ba
*Assistant Examiner*—Chih-Ching Chow

(57) ABSTRACT

A computer implemented method and apparatus for generating a destination header file based on a source header file is described. The method aspect comprises reading an entry from the source header file in a first programming language and converting the entry to a second programming language. The converted entry is then output to the destination header file.

16 Claims, 6 Drawing Sheets

```
1   #!/bin/ksh
2   #
3   #          Copyright (C) 2001 Hewlett-Packard Company
4   #
5   # This script is an example of how to read a "C" header file
6   # and convert it to be a Java class to be used in both languages.
7   # The user runs this script as part of the nightly build process.
8
9   # First, make sure the source file exists.
10
11  if [ ! -f consts.h ]
12  then
13    echo "ERROR:  The source \"C\" header file, \"consts.h,\" does not
14      exist."
15      echo "         Make sure the source header file exists and then re-
16          run"
17      echo "        this script."
18      exit 1;
19  fi
20
21  # Now, make sure the target file does NOT exist (remove if there)
22
23    rm -rf consts.java
24
25  #Create the header portion of our Java class
26
27    cat >> consts.java <<EOF
28  /**
29   * The SiteStats contains the site statistics.
30   **/
31
32  public class consts {
33
34      // Constants for integer fields.
35
36  EOF
```

Figure 3A

```
37  # Now, read in the constants from the "C" header file and write
38  # them out to the java class file.
39  #
40  # NOTE:   It's possible in C to define more complex values (like
41  #         arrays). This script is a simple script that will only
42  #         work for constant integer values.  That's why it will
43  #         check for the "extra" string.  If that string has anything
44  #         in it, then this line is not a simple constants value.
45
46  IFS=", "
47  cat consts.h | while read def name value extra
48  do
49      if [ "$def" = "#define" ]
50      then
51          if [ -z "$extra" ]
52          then
53              echo "   public final static int $name = $value;" >> consts.java
54          else
55              echo "INFO: Found non-conforming entry in consts.h file."
56              echo "      Value, \"$name\" does not appear to be a simple"
57              echo "      integer definition.  This value will not be put"
58              echo "      into the consts.java class.  You should put this"
59              echo "      value into some other java class file if you need it."
60              echo ""
61          fi
62      fi
63  done
64
65  # Now, print the ending brace
66
67  echo "" >> consts.java
68  echo "} // Java class consts" >> consts.java
69  echo "" >> consts.java
70  echo "Done creating the java consts file from the \"C\" header file!"
```

Figure 3B

```
1  // arrayIndex.h:  File with index values into integer, long
2  // and double arrays.  Used to read shared memory from WMT and
3  // to then send them back to the Java environment.
4
5  // Index values into the Shared memory arrays
6  #define MGT_INDX_LOW   0
7  #define MGT_INDX_MED   1
8  #define MGT_INDX_HIGH  2
9
10 #define SESSIONS    0
11 #define RESP_HIGH   1
12 #define RESP_MEDIUM 2
13 #define RESP_LOW    3
14 #define ADMIT_HIGH  4
```

Figure 4

```
1  /**
2   * The SiteStats contains the site statistics.
3   **/
4  public class consts {
5
6      // Constants for integer fields.
7
8      public final static int MGT_INDX_LOW  = 0;
9      public final static int MGT_INDX_MED  = 1;
10     public final static int MGT_INDX_HIGH = 2;
11     public final static int SESSIONS   = 0;
12     public final static int RESP_HIGH  = 1;
13     public final static int RESP_MEDIUM = 2;
14     public final static int RESP_LOW   = 3;
15     public final static int ADMIT_HIGH = 4;
16
17 } // Java class consts
```

Figure 5

CONSTANT VALUES IN MIXED LANGUAGE PROGRAMMING ENVIRONMENTS

FIELD OF THE INVENTION

The present invention relates generally to a method of and apparatus for maintaining consistency between header files for differing computer program languages. More particularly, the invention relates to automatically generating one or more header files in a programming language based on a header file in a different programming language.

BACKGROUND ART

Header files are files that are included in other files prior to compilation by a programming language preprocessor. Some header files, such as stdio.h, are defined at the computer operating system level and must be included by any program using a standard input/output (I/O) library. Header files are also used to specify data declarations and "defines", i.e. definitions, that are needed by more than one computer program. Header files are typically functionally organized, i.e., declarations for separate software or hardware subsystems are in separate header files. Also, if a set of declarations is likely to change when code is ported from one machine to another, those declarations are typically in a separate header file.

Header files that declare software functions or external variables are typically included in the file that defines the function or variable. That way, the compiler can do type checking and the external declaration will always agree with the definition.

Prior to this method, the constant values would be defined in separate files in all of the environments for the project as described above. A comment would be placed above the constant definitions warning any future programmer that if they change any of those constant values that they should also change them in the other header files in other programming environment(s). This manual method of "multiply defining" values is error prone and causes drastic program failures. Therefore, there is a need in the art for a method to reduce or eliminate multiple definition of constants errors because of different programming languages used in the header file.

There are times in programming projects that constant defined values (#define name value" in "C", for example) are needed in other components of the project that are written in a different programming language(s). The header files (files where the constants are defined) might not be able to be read by the other programming language(s).

If the same constant values or constant entries are defined in more than one programming environment, it is possible for one instance of the value to be changed without updating all other instances of the value. Constant entries having different values causes catastrophic errors in the program.

The only other prior solution is to put comments near the values used in multiple locations warning users that if they change the value to make sure that the other locations of the constant entry are also updated. This manual process is error prone and time consuming. Therefore, there is a need in the art for an automatic method of updating constant values.

Because the constant values may be located in multiple, different programming language versions of a header file, it is necessary to ensure that the different language header files be synchronized. Thus, if a constant value in a first header file in programming language A is modified and the same constant value is used in a second header file in a second programming language B, then the constant value in the second header file needs to be modified, as well. Thus, there is a need in the art for an automatic method of generating a header file in a programming language based on a header file in a different programming language.

DISCLOSURE/SUMMARY OF THE INVENTION

It is therefore an object of the present invention to provide an automatic method of updating constant values in a mixed language programming environment.

Another object of the present invention is to provide an automatic method of generating a header file in a programming language based on a header file in a different programming language.

The above described objects are fulfilled by a computer implemented method and apparatus for generating a destination header file based on a source header file. A method aspect comprises reading an entry from the source header file in a first programming language and converting the entry to a second programming language. The converted entry is then output to the destination header file.

An apparatus aspect includes one or more processors for receiving and transmitting data, and a memory coupled to the processors. The memory has a source header file and sequences of instructions stored therein which, when executed by a processor, causes the processor to read an entry from the source header file in a first programming language. The entry read from the source header file is checked for convertibility to a second programming language prior to converting the entry and if the entry is not convertible to the second programming language then an error is output and another entry read from the source header file. The entry read from the source header file is then converted to a second programming language and output to a destination header file.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 3A and 3B are a script listing of a particular embodiment of the present invention;

FIG. 4 is an example listing of a source header file read by an embodiment of the present invention;

FIG. 5 is an example listing of a converted header file output by an embodiment of the present invention; and, FIG. 6 is a block diagram of a computer system for use with an embodiment of the present invention.

BEST MODE FOR CARRYING OUT THE INVENTION

A method and apparatus for automatic generation of constant values in mixed language programming environments are described. In the following description, for purposes of explanation, numerous specific details are set forth in order to provide a thorough understanding of the present invention. It will be apparent; however, that the present invention may be practiced without these specific details. In other instances, well-known structures and devices are shown in block diagram form in order to avoid unnecessarily obscuring the present invention.

DETAILED DESCRIPTION

A script or program reads a header file with constant values used in a project written in one language and automatically creates a header file in a format readable by other programming language(s) to allow the other environment(s) to use the same constant values. The header file needed by the other programming language(s) is not defined, but is created dynamically during each compilation of the project.

Figure 1:
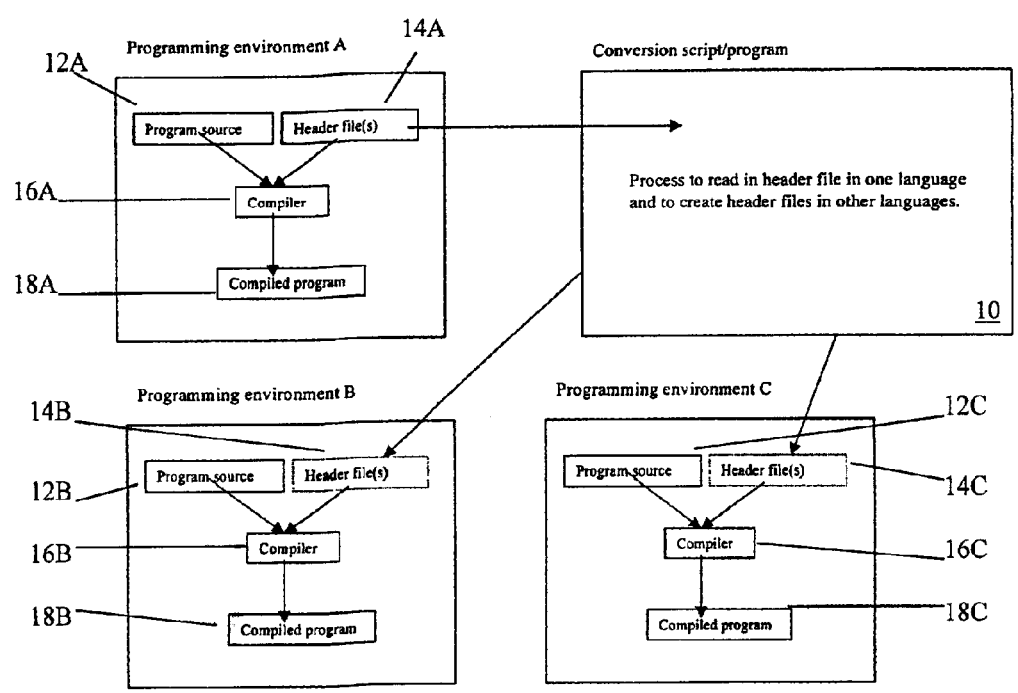
FIG. 1 is a top level block diagram of an example of the operation of the present invention.

FIG. 1 is a high level block diagram of an example use of an embodiment of the present invention. The diagram of FIG. 1 includes a primary programming environment A, e.g., a C language programming environment, two secondary programming environments B and C, e.g., a Java language programming environment and a C language programming environment, and a conversion script or program 10.

Each of the programming environments A–C include similar components: a program source file 12A–12C is the source code for the program to be compiled, a header file 14A–14C is the header file for constant data declarations and definitions, a compiler 16A–16C is the software executable for compiling the program source file 12A–12C in conjunction with the header file 14A–14C to produce a compiled program 18A–18C, and the compiled program 18A–18C is the file resulting from execution of the compiler 16A–16C. It is to be understood that the programming language(s) used in a programming environment may be other than those described herein, e.g., C, C++, Java, Pascal, Ada, COBOL, BASIC, FORTRAN, Perl, Python, and derivatives thereof.

The conversion script 10 (described in more detail below) may be either a script, i.e., a series of commands to be executed by the operating system or a shell as is known in the art, or an executable program to be executed by the operating system. The conversion script 10 reads in the header file 14A from programming environment A, converts the header file 14A to the appropriate language, and writes out header files 14B and 14C for use by the respective programming environments B and C.

In the normal course of use of a programming environment, a first user working in programming environment A creates the program source file 12A and header file 14A, e.g., in the C programming language. The first user then causes the program source file to be compiled using compiler 16A and header file 14A. The compiler 16A generates the compiled program 1 8A for use or further distribution by the first user.

Thus, as described in connection with the prior art above, previous approaches required users using different programming environments, e.g., programming environments A–C, to either maintain distinct and consistent header files 14A–14C or to distribute one header file, e.g., 14A, to each of the users for modifications making the header file 14A useable in the respective programming environments B and C. As stated above, this lead to inconsistent and hard to maintain header files in each of the programming environments. Advantageously, the present invention easily and consistently generates the modified header files 14B and 14C for the respective programming environments B and C. The conversion script 10 functionality is now described in detail.

Functional

Figure 2:
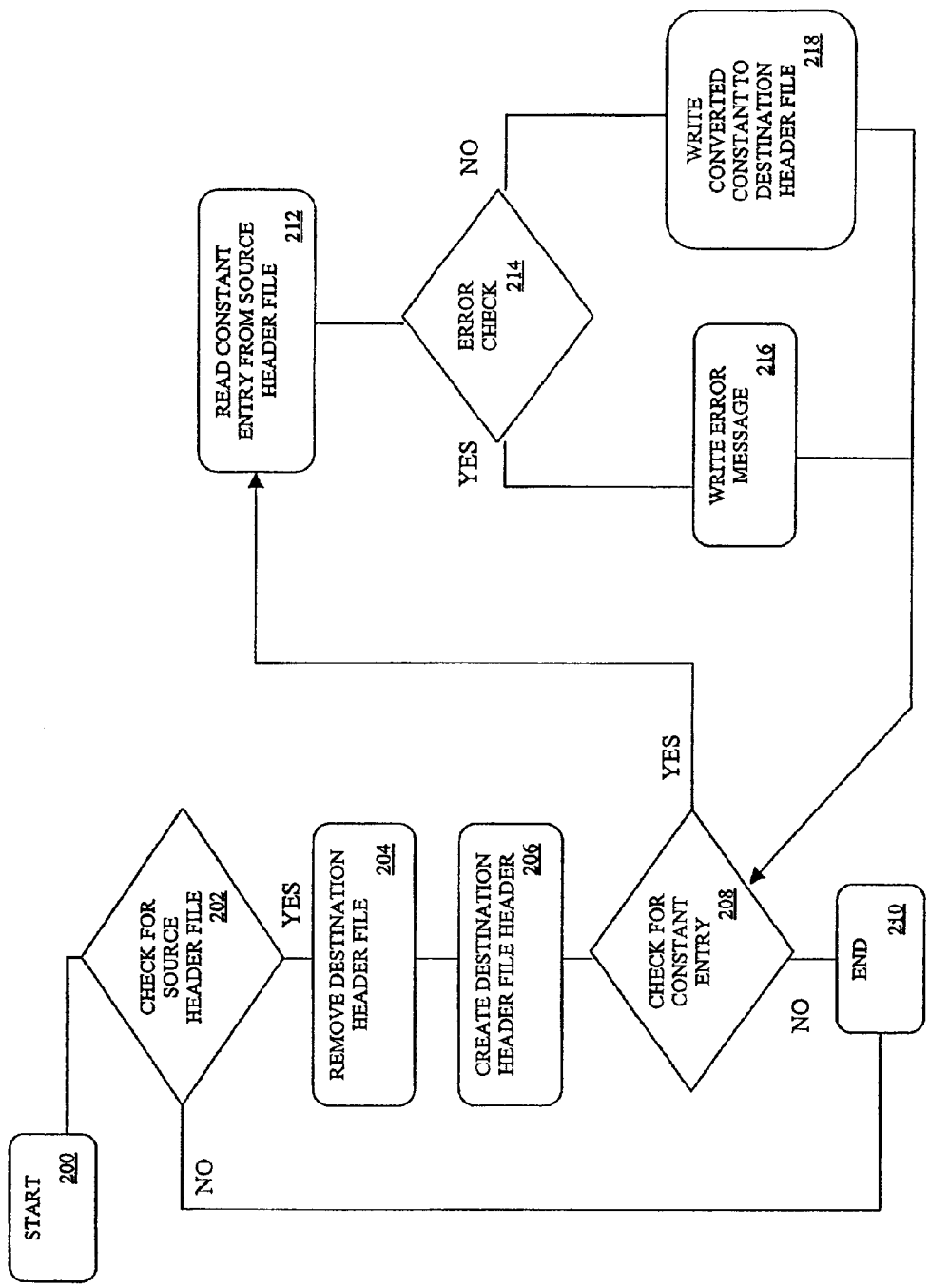
FIG. 2 is a high level functional flow diagram of an embodiment of the present invention.

FIG. 2 is a functional flow diagram of the functionality of conversion script 10 of FIG. 1. The conversion script 10 is a simple example and it is intended that the present application cover a broader range of examples; however, for simplicity in presentation a single example is described below. For example, although an integer conversion is described, the present invention can be used for much more complex data type conversions. Additional enhancements can also include determining whether a "long" type should be used based on the size of a number or if a decimal is present using a "double" type. A string constant or an array of another data type, e.g., integer, long, character, etc., may also be determined by the script. Conversion script 10 may convert many different data types, such as byte, short, int, long, float, double, boolean, char, and string. Also, C programming language structures or structs may be represented as Java programming language objects.

The description assumes that programming environment A is the source of a source header file to be converted by the conversion script 10 and programming environments B and C are the destinations for the converted or destination header file. The functional flow begins at step 200 and proceeds to step 202 wherein a check is performed to see if a source header file 14A exists.

If the source header file 12A does not exist, then there is no header file for conversion and the flow proceeds to step 210 and the script ends.

If, however, the source header file 12A does exist, then the flow of control proceeds to step 204 for removal of the destination header files 14B and 14C, if they exist in the respective programming environments B and C. Removing the destination header files ensures creation of new destination header files and prevents inadvertent use of old files if an error is encountered during execution of the conversion script 10. That is, if the destination header files were not removed and an error were encountered halting the conversion script, a user in programming environments B or C might assume that the existing destination header files were the most recent files and use them in performing compilations. This could lead to additional errors and confusion.

After removing any existing destination header files, the flow proceeds to step 206 wherein the destination header file header is created. The header file header provides information about the contents of the header file. The flow of control proceeds to step 208 to check for a constant entry, i.e., a constant definition or declaration in a specified programming language, in the source header file 14A to be converted.

In step 208, conversion script 10 performs a check to see if there is a constant entry in the header file 14A to be converted. If a constant entry is found, the flow proceeds to step 212 wherein the constant entry is read from the source header file 14A. The flow then proceeds to step 214 for a check to see if the constant entry conforms to a constant definition known to the conversion script 10. Constant definitions may be stored in a main memory 66 or a storage device 70 of a computer system 60, as described below, and may be obtained by means of a lookup table or other mechanisms as known in the art.

If the read constant entry is not found in the constant definitions known to the conversion script 10, the flow proceeds to step 216 wherein the conversion script outputs an error message stating that the constant entry is in error. The error message may be an output message written to a log file or an error window. The flow then proceeds to step 208 and checks for another constant entry in the source header file.

If the read constant entry is found in the constant definitions known to the conversion script, the flow proceeds to step 218. In step 218, the conversion script 10 converts the read constant entry to the appropriate constant entry for the respective programming environments B and C and outputs the converted constant entry to the destination header files 14B and 14C, respectively. The flow then proceeds to step 208 and checks for another constant entry in the source header file.

As described above, if there is not another constant entry in the source header file 14A, the flow proceeds to step 210 and the execution of conversion script 10 ends.

An example shell script for performing the above-described conversion script 10 is provided in FIGS. 3A and 3B and described below.

The script listing of FIGS. 3A and 3B is a "KornShell" script listing. The KornShell is a particular mechanism for manipulating an operating system which is known to persons of ordinary skill in this art. The line numbers do not form a part of the script listing, they are only provided as reference points. The listing is now described with reference to the functional flow diagram of FIG. 2.

Lines 11–19 correspond to the functionality of step 202 of FIG. 2. A test is performed by the script 10 to determine the existence of a source header file 14A. At line 18, the script 10 exits if there is no source header file 14A on which script can operate, i.e., there is no source header file from which the script can read constant entries, corresponding to step 210.

Line 23 removes the destination header file 14B if it exists, in accordance with step 204 of the functional flow. Lines 27–36 correspond to the functionality of step 206 and create the destination header file header.

Line 47 performs the check for constant step 208 and reads the constant entry from the source header file 14A, if a constant entry exists. Lines 49–62 correspond to the functionality of steps 214, 216, and 218 wherein the error check is performed (line 51), an error message is written or output if an error is found (lines 54–61), and the converted constant is written or output to the destination header file 14B if no error is found (lines 52 and 53), respectively.

FIG. 4 is an example C language programming environment header file usable with an embodiment of the present invention. Lines 1–5 are comment lines providing a textual description of the contents of the file and other information. Lines 6–14 specify particular data definitions, i.e., constant entries, for use in the C programming language. Script 10 reads the constant entries listed in lines 6–14 of FIG. 4. Particularly, the constant entries of lines 6–14 are integer defines of specific values, as is known in the art. It is to be understood that the constant values could be any type of data definition or declaration having a corresponding type in another programming language, e.g., the #define integer value of the C programming language of FIG. 4 correspond to a public final static int value in the Java programming language as shown in the constant entries of FIG. 5, described below.

FIG. 5 is an example Java language programming environment header file created as output from an embodiment of the present invention using the input header file of FIG. 4. Lines 1–6 are the header portion of the header file and provide information about the contents of the header file. Lines 8–15 are converted constant entries corresponding to the constant entries of lines 6–14 of the header file of FIG. 4, i.e., the constant entries of lines 6–14 have been converted by script 10 into public final static integer values in the Java programming language.

Hardware Overview

Figure 6:
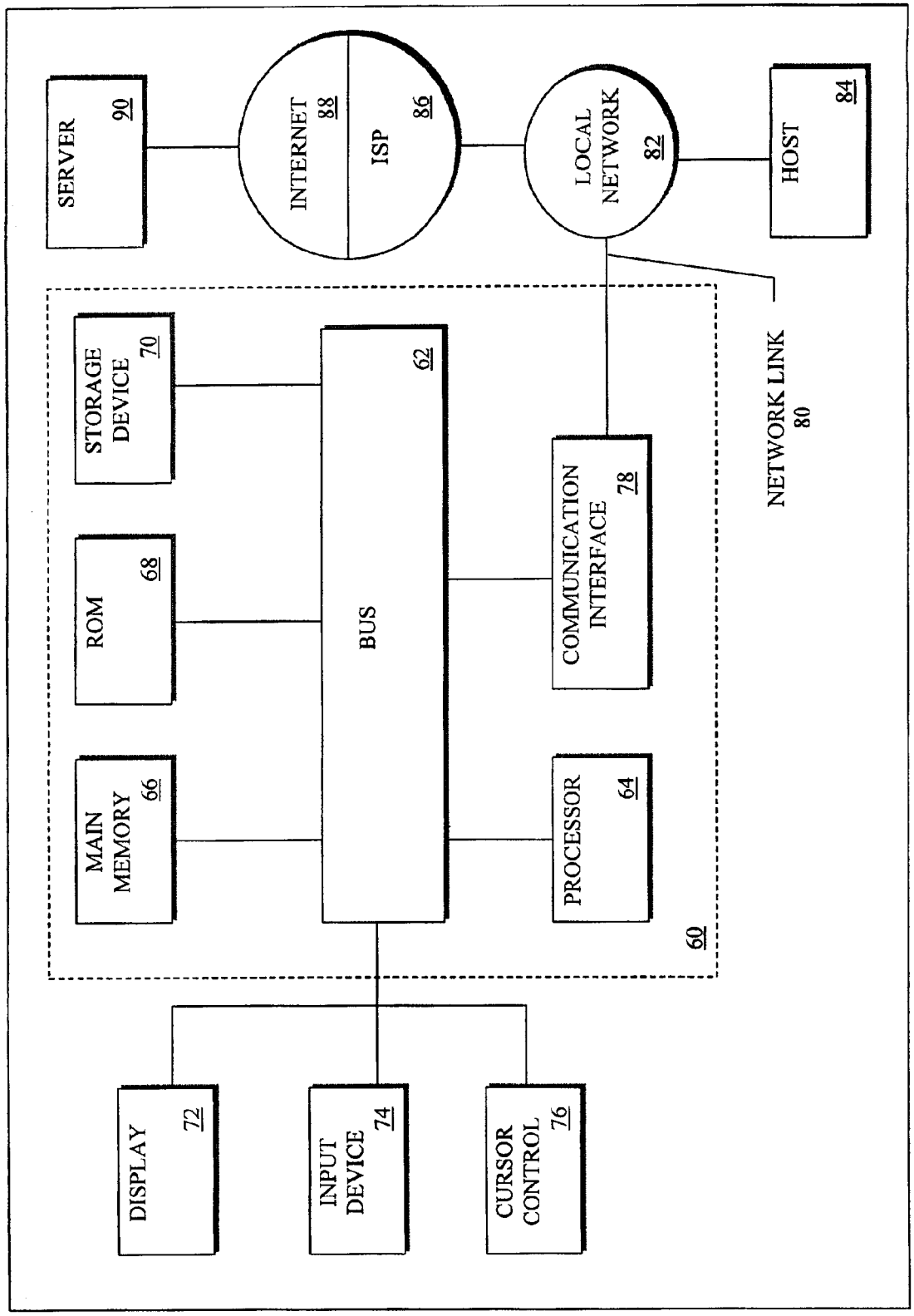

FIG. 6 is a block diagram illustrating an exemplary computer system 60 upon which an embodiment of the invention may be implemented. The present invention is usable with currently available personal computers, mini-mainframes, enterprise servers, multiprocessor computers and the like.

Computer system 60 includes a bus 62 or other communication mechanism for communicating information, and a processor 64 coupled with the bus 62 for processing information. Computer system 60 also includes a main memory 66, such as a random access memory (RAM) or other dynamic storage device, coupled to the bus 62 for storing information and instructions to be executed by processor 64. Main memory 66 also may be used for storing temporary variables or other intermediate information during execution of instructions to be executed by processor 64. Computer system 60 further includes a read only memory (ROM) 68 or other static storage device coupled to the bus 62 for storing static information and instructions for the processor 64. A storage device 70, such as a magnetic disk or optical disk, is provided and coupled to the bus 62 for storing information and instructions.

Computer system 60 may be coupled via the bus 62 to a display 72, such as a cathode ray tube (CRT) or a flat panel display, for displaying information to a computer user. An input device 74, including alphanumeric and other keys, is coupled to the bus 62 for communicating information and command selections to the processor 64. Another type of user input device is cursor control 76, such as a mouse, a trackball, or cursor direction keys for communicating direction information and command selections to processor 64 and for controlling cursor movement on the display 72. This input device typically has two degrees of freedom in two axes, a first axis (e.g., x) and a second axis (e.g., y) allowing the device to specify positions in a plane.

The invention is related to the use of a computer system 60, such as the illustrated system, to provide an expression-based mechanism for triggering and testing corner-case exceptional conditions in software and use thereof. According to one embodiment of the invention, a software trigger facility for testing software exceptional conditions is provided by computer system 60 in response to processor 64 executing sequences of instructions contained in main memory 66. Such instructions may be read into main memory 66 from another computer-readable medium, such as storage device 70. However, the computer-readable medium is not limited to devices such as storage device 70.

For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 66 causes the processor 64 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 60 also includes a communication interface 78 coupled to the bus 62. Communication interface 78 provides a two-way data communication as is known. For example, communication interface 78 may be an integrated services digital network (ISDN) card, a digital subscriber line (DSL), or a modem to provide a data communication connection to a corresponding type of telephone line. As another example, communication interface 78 may be a local area network (LAN) card to provide a data communication connection to a compatible LAN. Wireless links may also be implemented. In any such implementation, communication interface 78 sends and receives electrical, electromagnetic or optical signals which carry digital data streams representing various types of information. Of particular note, the communications through interface 78 may permit transmission or receipt of the operating software program scheduling information. For example, two or more computer systems 60 may be networked together in a conventional manner with each using the communication interface 78.

Network link 80 typically provides data communication through one or more networks to other data devices. For example, network link 80 may provide a connection through local network 82 to a host computer 84 or to data equipment operated by an Internet Service Provider (ISP) 86. ISP 86 in turn provides data communication services through the world wide packet data communication services through the world wide packet data communication network now commonly referred to as the "Internet" 88. Local network 82 and Internet 88 both use electrical, electromagnetic or optical signals which carry digital data streams. The signals through the various networks and the signals on network link 80 and through communication interface 78, which carry the digital data to and from computer system 60, are exemplary forms of carrier waves transporting the information.

Computer system 60 can send messages and receive data, including program code, through the network(s), network link 80 and communication interface 78. In the Internet example, a server 90 might transmit a requested code for an application program through Internet 88, ISP 86, local network 82 and communication interface 78. In accordance with the invention, one such downloaded application provides for an expression-based mechanism for triggering and testing exceptional conditions in software and use thereof, as described herein.

The received code may be executed by processor 64 as it is received, and/or stored in storage device 70, or other non-volatile storage for later execution. In this manner, computer system 60 may obtain application code in the form of a carrier wave.

Example

For example, if a user was using a mixed C/Java programming environment, the user would create the ".h" files (i.e., C language header file) in the C programming environment having the "#define variable" constants. A script or program would parse the C header file and then generate as output the "java" file (i.e., a Java language header file) usable in the Java programming environment. Then, during the nightly build of the product, after the process updated all of the files changed in the prior day, the script would execute to create the header file(s) needed by the Java programming environment for the build.

An advantage of this automatic method is that the constant values used in all of the programming environments will always be the same. This increases the quality of the shipped product.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented method of generating a destination header file based on a source header file comprising the following steps:
   removing any existing destination header file if a source header file exists;
   reading an entry from the source header file in a first programming language, wherein the source header file is generated for a first program source in the first programming language and the source header file includes user-specified constant values;
   checking the entry read from the source header file for convertibility to a second programming language prior to converting the entry;
   outputting an error and performing said reading step for another entry, if the entry is not convertible to the second programming language;
   converting the entry from the source header file to the second programming language, if the entry is convertible to the second programming language;
   outputting the converted entry to the destination header file; and
   compiling a second program source in the second programming language with the destination header file in the second programming language, wherein the first program source and the second program source are different program sources in a mixed language programming environment.

2. The method as claimed in claim 1 comprising if said reading step fails to read an entry ending the method after said reading step.

3. The method as claimed in claim 1 wherein the first and second programming languages are at least one of C, C++, Java, Pascal, Ada, COBOL, BASIC, FORTRAN, Perl, Python, and derivatives thereof.

4. The method as claimed in claim 1 wherein the entry is at least one of a byte, short, int, long, float, double, boolean, char, string, and struct.

5. The method as claimed in claim 1 wherein said outputting an error step includes writing a message to a log file or an error window.

6. A computer implemented method of generating a destination header file based on a source header file comprising the following steps:
   reading an entry from the source header file in a first programming language, the source header file generated for a first program source in the first programming language;

converting the entry to a second programming language;

outputting an error and performing said reading step for another entry, if the entry is not convertible to the second programming language;

outputting the converted entry to the destination header file; and compiling a the destination header file and a second program source in the second programming language, wherein the first program source and the second program source are different program sources in a mixed language programming environment.

7. The method of claim 6 further comprising:

first, checking for the existence of the source header file; and second, if the source header file does not exist ending the method prior to performing said reading, converting, and outputting steps.

8. The method of claim 6 further comprising:

removing any existing destination header file prior to said reading step.

9. The method of claim 6 further comprising:

checking the entry from the source header file for convertability to a second programming language prior to converting the entry; and if the entry is not convertable to the second programming language then outputting an error and performing said reading step.

10. The method as claimed in claim 6 wherein the entry is at least one of a byte, short, int, long, float, double, boolean, char, string and struct.

11. A computer system for generating a destination header file based on a source header file comprising:

one or more processors for receiving and transmitting data; and a memory coupled to said one or more processors, said memory having stored therein a source header file and sequences of instructions, wherein the source header file includes user-specified constant values, which, when executed by one of said one or more processors, cause one of said one or more processors to read an entry from the source header file in a first programming language, the source header file generated for a first program source in the first programming language, check the entry read from the source header file for convertibility to a second programming language prior to converting the entry, output an error and reading another entry from the source header file if the entry is not convertible to the second programming language, convert the entry from the source header file to a second programming language if the entry is convertible to the second programming language, output the converted entry to a destination header file, and compile a second program source in the second programming language with the destination header file in the second programming language, wherein the first program source and the second program source are different program sources in a mixed language programming environment.

12. The apparatus as claimed in claim 11 wherein the first and second programming languages are at least one of C, C++, Java, Pascal, Ada, COBOL, BASIC, FORTRAN, Perl, Python, and derivatives thereof.

13. The method as claimed in claim 11 wherein the entry is at least one of a byte, short, int, long, float, double, boolean, char, string, and struct.

14. The method as claimed in claim 1, wherein the first program source and the second program source are different components of a project.

15. The method as claimed in claim 6, wherein the first program source and the second program source are different components of a project.

16. The method as claimed in claim 11, wherein the first program source and the second program source are different components of a project.

* * * * *